United States Patent
Rudrapatna

(10) Patent No.: US 8,032,183 B2
(45) Date of Patent: Oct. 4, 2011

(54) ARCHITECTURE TO SUPPORT NETWORK-WIDE MULTIPLE-IN-MULTIPLE-OUT WIRELESS COMMUNICATION

(75) Inventor: Ashok N Rudrapatna, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 427 days.

(21) Appl. No.: 11/778,282

(22) Filed: Jul. 16, 2007

(65) Prior Publication Data

US 2009/0022089 A1  Jan. 22, 2009

(51) Int. Cl.
H04M 1/00  (2006.01)

(52) U.S. Cl. .............. 455/562.1; 455/13.3; 455/103; 375/367; 342/368

(58) Field of Classification Search .......... 455/103, 455/115.1, 115.2, 91, 95, 102, 126, 129, 455/424, 425, 456.5, 13.3, 17, 522, 69, 70, 455/67.11, 67.13, 67.14, 67.16, 114.2; 375/219, 375/140, 141, 146, 147, 260, 267, 221, 295; 342/170–175, 195, 368, 371, 362
See application file for complete search history.

(56) References Cited

U.S. PATENT DOCUMENTS

| | | | | |
|---|---|---|---|---|
| 6,466,167 B1* | 10/2002 | Steinbrecher | ............... | 342/378 |
| 6,487,187 B1* | 11/2002 | Schmutz et al. | ............. | 370/337 |
| 6,496,140 B1* | 12/2002 | Alastalo | .......... | 342/174 |
| 6,580,705 B1 | 6/2003 | Riazi et al. | .................. | 370/204 |
| 6,891,497 B2* | 5/2005 | Coleman et al. | ............. | 342/174 |
| 6,895,230 B1* | 5/2005 | Blount et al. | ............... | 455/276.1 |
| 7,116,267 B2* | 10/2006 | Schuster et al. | ............... | 342/174 |
| 7,236,750 B2* | 6/2007 | Vaidyanathan et al. | ........ | 455/84 |
| 7,409,191 B2* | 8/2008 | Azuma | .......................... | 455/103 |
| 7,515,097 B2* | 4/2009 | Smith et al. | ................... | 342/175 |
| 2005/0288012 A1* | 12/2005 | Morgan | ........................ | 455/428 |
| 2006/0154607 A1* | 7/2006 | Kenney et al. | ............. | 455/67.11 |
| 2009/0190569 A1* | 7/2009 | Hacena | ........................ | 370/350 |

FOREIGN PATENT DOCUMENTS

| | | |
|---|---|---|
| DE | 199 43 952 A1 | 3/2001 |
| EP | 1 098 390 A | 5/2001 |
| WO | WO 99/63619 A | 12/1999 |
| WO | WO 2004/107693 A | 12/2004 |

OTHER PUBLICATIONS

Communication relating to the results of the International Search Report from counterpart International Application No. PCT/US2008/008204 dated Nov. 25, 2008.

* cited by examiner

*Primary Examiner* — Sujatha Sharma
(74) *Attorney, Agent, or Firm* — Williams, Morgan & Amerson, PC

(57) ABSTRACT

The present invention provides a method of coordinating transmission by and reception by a plurality of antennas associated with a plurality of radio heads. The method includes determining, at a controller, at least one relative time delay associated with a plurality of backhaul links between the controller and the plurality of radio heads. The method also includes providing information indicative of a first signal over the plurality of backhaul links. The method further includes providing timing information over the plurality of backhaul links. The timing information is determined based on the relative time delay(s) such that the plurality of radio heads can use the provided timing information to coherently transmit the first signal using the plurality of antennas and a plurality of controllers to receive mobile unit transmitted information.

39 Claims, 2 Drawing Sheets

ARCHITECTURE TO SUPPORT NETWORK-WIDE MULTIPLE-IN-MULTIPLE-OUT WIRELESS COMMUNICATION

BACKGROUND OF THE INVENTION

1. Field of the Invention

This invention relates generally to communication systems, and, more particularly, to wireless communication systems.

2. Description of the Related Art

Base stations in wireless communication systems provide wireless connectivity to users within a geographic area, or cell, associated with the base station. In some cases, the cell may be divided into sectors that subtend a selected opening angle (e.g., three 120° sectors or six 60° sectors) and are served by different antennas. The wireless communication links between the base station and each of the users typically includes one or more downlink (DL) (or forward) channels for transmitting information from the base station to the mobile unit and one or more uplink (UL) (or reverse) channels for transmitting information from the mobile unit to the base station. Multiple-input-multiple-output (MIMO) techniques may be employed when the base station and, optionally, the user terminals include multiple antennas. For example, a base station that includes multiple antennas can concurrently transmit multiple independent and distinct signals on the same frequency band to same user or multiple users in a cell/sector. MIMO techniques are capable of increasing the spectral efficiency of the wireless communication system roughly in proportion to the number of antennas available at the base station.

Conventional MIMO techniques require that the multiple antennas be co-located with the coordinating base station so that the relative timing delays introduced by propagation from the base station to the antenna are negligibly small. For example, the multiple antennas associated with a base station (BS) are typically configured so that the antennas are less than about 10 m from the base station. Typically these connections between the BS and its antennas are broadband high-grade RF cables. Furthermore, the relative differences in the distances from the BS to each of its antennas is very small. Thus the actual value of the relative time delay differences are usually significantly smaller than the absolute delay between the BS and an antenna because each antenna is deployed approximately the same distance from the base station. When the relative time delay for signals transmitted between the antennas and the base station is negligibly small, the signals transmitted from the base station to the antennas and then over the air interface to MS on DL may be phase aligned easily so that they can be coherently combined at the receiver, e.g., the mobile unit. Constructive and/or destructive interference of coherent radiation from the multiple antennas can therefore be used to amplify the signal in selected directions and/or null the signal in other directions. Processing of the coherent signals may also be used to minimize the mutual interference between multiple transmitters. Similarly on UL, signals received from multiple antennas can be combined to maximize signal strength, maximize SINR, detect multiple signals simultaneously through well-known algorithms such as MRC (maximum ratio combining), MMSE (minimum mean squared error), and MLSE (maximum likelihood sequence estimator).

Conventional soft handoff techniques employ multiple BSs for both DL and UL to improve diversity but do not exploit joint spatial processing techniques that can yield much higher gains. Increasing the separation between antennas significantly can reduce the coherence between the signals transmitted and/or received by these antennas because of the potentially large and unpredictable relative time delays introduced by transmitting these signals to a central point for processing. For example, signals received (or transmitted) by antennas at two geographically separated base stations would need to be transmitted to (or received from) a central location using MS specific timing in a very tightly controlled and coordinated manner to achieve the gains this disclosure addresses. However, conventional backhaul links to the central location introduce large and/or variable timing delays that cause the signals carried over the backhaul links to become incoherent. Consequently, each base station independently decodes signals received over an uplink and transmits signals over the downlink. The demodulating and decoding processes at separate base stations are not coordinated and the signals transmitted by different base stations cannot be coherently combined. Similarly signals transmitted by conventional base stations are not coordinated to permit the signals to be coherently combined at the mobile units.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for coordinating transmission by a plurality of antennas associated with a plurality of radio heads. The method includes determining, at a controller, at least one relative time delay associated with a plurality of backhaul links between the controller and the plurality of antennas at associated radio heads. The method also includes providing information indicative of a first signal over the plurality of backhaul links. The method further includes providing timing information over the plurality of backhaul links. The timing information is determined based on the relative time delay(s) such that the plurality of radio heads can use the provided timing information to coherently transmit the first signal using the plurality of antennas.

In another embodiment of the present invention, a method is provided for coordinating transmission by a plurality of antennas associated with a plurality of radio heads. The method includes receiving, at one of the plurality of radio heads over at least one of a plurality of backhaul links between at least one controller and the plurality of radio heads, information indicative of a first signal. The method also includes receiving, at radio head over at least one of the plurality of backhaul links, timing information determined based on at least one relative time delay associated with the plurality of backhaul links. The method also includes transmitting the first signal from the antenna(s) at a time indicated by the provided timing information. The first signal is transmitted coherently with transmissions of the first signal by at least one other radio head.

In yet another embodiment of the present invention, a method is provided for combining information received by a plurality of antennas associated with a plurality of radio heads. The method includes receiving, over a plurality of backhaul links between a controller and the plurality of radio heads, information indicative of at least one first signal transmitted by at least one mobile unit and received by the plurality of antennas. The method also includes coherently combining the information received over the plurality of backhaul links using timing information associated with the plurality of backhaul links.

In yet a further embodiment of the present invention, a method is provided for combining information received by a plurality of antennas associated with a plurality of radio heads that communicate with at least one controller over a plurality of backhaul links. The method includes transmitting information indicative of at least one first signal received by at least one antenna associated with the first radio head over at least one backhaul link between a first radio head and said at least one controller. The information is transmitted such that it can be coherently combined with information transmitted over at least one backhaul link by at least one second radio head using timing information determined based on a plurality of signals transmitted over the plurality of backhaul links.

BRIEF DESCRIPTION OF THE DRAWINGS

The invention may be understood by reference to the following description taken in conjunction with the accompanying drawings, in which like reference numerals identify like elements, and in which.

Figure 1:
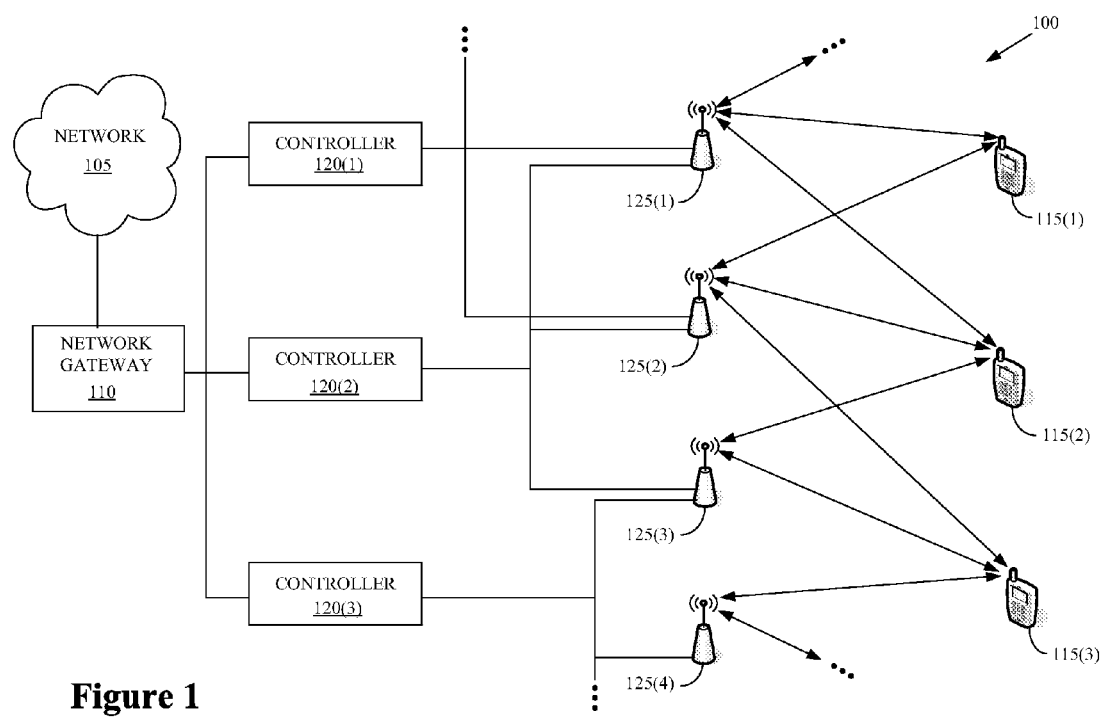
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i. e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes a network 105 that may be accessed via a network gateway 110. The network 105 may operate according to any combination of wired and/or wireless communication standards and/or protocols. Exemplary standards and/or protocols include the Public Switched Telephone Network (PSTN) standards and/or protocols, the Universal Mobile Telecommunication System (UMTS) standards and/or protocols, the Global System for Mobile communications (GSM) standards and/or protocols, IP network and the like. Techniques for accessing the network 105 via the network gateway 110 and/or providing information from the network 105 through the network gateway 110 are known in the art and in the interest of clarity only those aspects of these techniques that are relevant to the present invention will be discussed herein. Alternatively, the network gateway 110 may be bypassed (or may not be present) and the network 105 may be accessed directly. This type of embodiment may be used to support flat-IP or distributed architectures.

The wireless communication system 100 is used to provide wireless connectivity to one or more mobile units 115(1-3) so that they may access the network 105 via the network gateway 110. The indices (1-3) may be used to indicate individual mobile units or subsets of the mobile units. However, the indices may be dropped when referring to the mobile units collectively. This convention may also be applied to other elements shown in the drawings and indicated by a numeral and one or more distinguishing indices. Exemplary mobile units 115 may include cellular telephones, personal data assistants, smart phones, pagers, text messaging devices, Global Positioning System (GPS) devices, network interface cards, notebook computers, desktop computers, and the like. In various alternative embodiments, the mobile units 115 may include a single antenna or a plurality of antennas for communicating with the wireless communication system 100.

One or more controllers 120 are communicatively coupled to a plurality of radio heads 125 by a corresponding plurality of backhaul links. In alternative embodiments, the backhaul links may be implemented as wired links, wireless links, or a combination thereof. Each controller 120 may serve one or more mobile units 115 using multiple radio heads 125. As used herein in accordance with common usage in the art, the term "serve" will be understood to mean that each controller 120 is capable of creating the signals (or information that can be used to form the signals) that can be transmitted collaboratively by the radio heads 125 over the downlink. Serving controllers 120 are also capable of receiving signals from multiple radio heads 125, combining these signals, and extracting the signals transmitted by the served mobile units 115. In one embodiment, each mobile unit 115 is served by a single controller 120. However, in alternative embodiments, multiple controllers 120 may be used to serve a single mobile unit 115. In this detailed description, the term "radio head" is used interchangeably with their subtending antennas. Radio heads in many cases refer to the antennas.

The radio heads 125 are configured to receive signals from the controllers 120 for transmission over the downlink to the mobile units 115. In one embodiment, the controllers 120 may provide these signals in the form of modulated and encoded analog baseband signals that can be transmitted over the backhaul links to the radio heads 125. Alternatively, the controllers 120 may provide oversampled digital baseband signals to the radio heads 125. Examples of the oversampled digital baseband signal are In-phase and Quadrature (I and Q as they are known to those skilled in the art) signals sampled at a rate higher than the Nyquist rate and quantized with sufficient number of bits needed to satisfy the maximum quantization noise requirements. In OFDMA systems, these sampling rates could be at the specified DFFT/IDFFT sampling rates or higher (approximately 11.2 MHz for a 10 MHz TDD 802.16e/WiMAX system). In spread spectrum systems, the I & Q signals would be sampled at a multiple of chipping rate (typically 4 or 8 times). These signals could be composite signals of all channels and information transmitted over the air or they could individual MS specific data, or individual channel specific data. The controllers 120 may also provide timing and/or phase information associated with the signals so that the radio heads 125 can synchronize transmission of the information. The timing and/or phase information may be selected so that information transmitted by the radio heads 125 in accordance with the timing and/or phase information can be coherently received at the mobile units 115, as will be discussed in detail herein. Controllers 120 may send one or more traffic and/or timing signals to radio heads 125. One signal or set of timing and traffic signals is sent for each antenna at the radio heads 125. The multiple signals may be sent separately or combined in such a manner that the radio heads 125 can properly separate them for transmission from its antennas. The coordinated operation of the controllers 120 and the radio heads 125 described herein may be referred to as "network wide multiple-in-multiple-out" operation.

Each controller 120 is communicatively coupled to a selected group of radio heads 125 by backhaul links, which may have multiple legs. For example, the controller 120(2) is communicatively coupled to the radio heads 125(1-3) via a backhaul link having three legs. Persons of ordinary skill in the art having benefit of the present disclosure should appreciate that the controllers 120 may be coupled to any number of radio heads 125 and that this number may be different for different controllers 120. The controllers 120 may act as serving entities for one or more mobile units 115 using the associated radio heads 125. For example, the signal strength and/or signal quality and/or complex channel gain measurements may be performed on the air interface between the radio heads 125 and the mobile units 115. Mobile units 115 may be added to (or removed from) the served set of mobile units based on these signal strength and/or signal quality and/or complex channel gain measurements. Each radio head 125 may be coupled to more than one controller 120 and may therefore receive signals from one or more serving controllers 120, depending on the distribution of the mobile units 115. The terms "complex channel gain" and "complex channel gain and phase" are used interchangeably herein in accordance with usage in the art.

The radio heads 125 may also receive signals from the mobile units 115 over the uplink. In one embodiment, the radio heads 125 do not contain conventional baseband digital processing units and so the radio heads 125 do not perform demodulation and/or decoding of signals received over the uplink. The radio heads 125 may therefore be implemented in radiofrequency units that convert received uplink signals to high fidelity analog baseband signals that may be used to modulate broadband transport systems such as optical or dark fiber in the backhaul links. Alternatively, the radio heads 125 may generate an oversampled digital baseband composite signal (e.g., the combined received signal of several MSs, both bearer and pilots, control signals, feedback channels, and any other signal transmitted over the air) from the signals received over the uplink and then transmit the high-resolution information preserving digital signal to the controllers 120 by modulating backhaul media (such as an optical carrier) or using an Internet protocol over Sonet-like facilities, i.e. broadband optical facilities that transport digital content over optical media. The controllers 120 may process the received signals, which may include both traffic and channel measurements from multiple radio heads 125, using algorithms such as channel estimation algorithms, MMSE, MRC, and/or MLSE. The controllers 120 may coherently combine the uplink signals received from the radio heads 125 using timing information associated with the backhaul links and then demodulate/decode the combined uplink signals to extract the individual MS transmitted data. It should be noted that FIG. 1 is a logical view. In a given realization, multiple entities may be co-located or combined into one physical entity. As an example, the controller 120(2) may be combined with the radio head 125(2) into one physical entity.

Signals transmitted over the backhaul links between the controllers 120 and the radio heads 125 should be tightly synchronized to facilitate the coherent combining of the signals that are transmitted to/by and/or received to/by the radio heads 125. In one embodiment, the controllers 120 determine the relative time delays between different branches of the backhaul links. When the controllers 120, the radio heads 125, and the backhaul links are configured so that the relative time delays associated with the different backhaul links are known and fixed, the controllers 120 may determine the relative time delays based on the configuration information. However, the stringent timing constraints imposed by requiring coherency of the signals transmitted and/or received by the radio heads 125 are likely to require dynamic determination of the relative time delays. In one embodiment, the controllers 120 may dynamically determine the relative time delays between the legs of the backhaul links by transmitting a timing signal to the radio heads 125, receiving an echo back from the radio heads 125, and determining the both the round-trip delay and one way delays between the controllers 120 and radio heads 125 based upon a response signal transmitted by the radio heads 125 when they receive the timing signal. The timing signals may be transmitted periodically, in response to initiation of a communication session with a mobile unit 115, and/or at any other time.

Alternatively, the radio heads 125 (and/or controllers 120) may transmit timing information with the signals received over the uplink. For example, the radio heads 125 (and/or controllers 120) may attach a timestamp to the received information before forwarding the received information to the controllers 120 (and/or radio heads 125). The value of the timestamp may be determined based upon a global or universal reference time, such as a reference time provided by a Global Positioning System or other synchronization methods such as IEEE 1588. The controllers 120 may use the timestamps attached to information received from multiple radio heads 125 to coherently combine the received information. For example, the controllers may use the timestamps to time-align the data streams received from different radio heads 125 so that the time-aligned data streams can be coherently combined. In one embodiment, the controllers 120 may also compare the timestamps attached to the information received from the multiple radio heads 125 to the time at which the controllers 120 received the information to determine relative time delays between the legs of the backhaul links. A global or universal reference time may be used to perform this comparison. These relative time delays may then be used to coordinate transmission of information over the downlinks so that the transmitted information may be coherently received with reduced or nulled-out interference at the mobile units 115.

The radio heads 125 may use the timestamps attached to information received from multiple controllers 120 to coherently transmit the received information. For example, the radio heads 125 may use the timestamps to time-align the data streams received from different controllers 120 so that the time-aligned data streams can be coherently combined before transmitting to mobile units 115. In one embodiment, the radio heads 125 may also compare the timestamps attached to the information received from the multiple controllers 120 to the time at which the radio heads 125 received the information to determine relative time delays between the legs of the backhaul links. A global or universal reference time may be used to perform this comparison. These relative time delays may then be used to coordinate transmission of information over the backhaul so that the transmitted information may be more easily coherently combined at the controllers 120.

Figure 2:
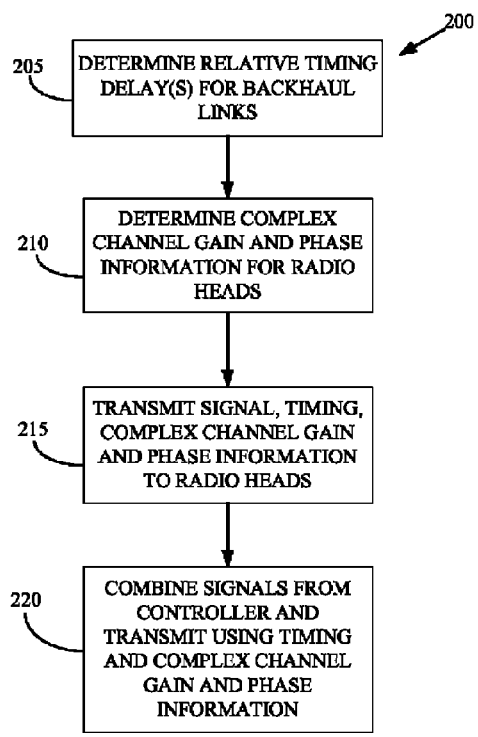
FIG. 2 conceptually illustrates one exemplary embodiment of a method of coherently transmitting signals from a plurality of radio heads, in accordance with the present invention.

FIG. 2 conceptually illustrates one exemplary embodiment of a method 200 of coherently transmitting signals from a plurality of radio heads. In the illustrated embodiment, the method 200 may be implemented in a controller, such as the controllers 120 depicted in FIG. 1. Each controller uses one or more radio heads to transmit signals to a selected group of mobile units. The set of radio heads used to transmit signals may be predetermined or may be selected dynamically for each mobile unit that is served by the controller. For example, different subsets of the radio heads connected to each controller may be selected to transmit information to different mobile units based upon signal strength measurements and/or quality of signal measurements, and/or complex channel gain measurements. The controller determines (at 205) relative time delays for the backhaul links (or legs of the backhaul links) between the controller and each of the radio heads that are going to be used to transmit signals. In one embodiment, the relative time delays are determined (at 205) dynamically, e.g., using embodiments of the techniques discussed herein. The controller may also determine and use (at 210) complex channel gain and phase information that may be used (with the provided timing information) by the radio heads to coordinate transmission so that signals intended for each mobile unit are received coherently combined over the air at the mobile unit with no or minimal other user signal interference.

The signal, timing, and/or complex channel gain and phase information may then be transmitted (at 215) to the radio heads over the backhaul links. In one embodiment, the controller may construct a composite signal that includes signal, timing, and/or phase information for each of the mobile units over each antenna at each radio head 125 that are served by the controller via each of the radio heads. The composite signal transmitted over the back haul may be an analog baseband signal and/or an oversampled digital baseband signal that modulates an optical carrier or a digital carrier system. The composite signals may then be forwarded (at 215) to the appropriate radio heads. The radio heads may combine (at 220) the composite signals received from one or more controllers using the timing and/or phase information. For example, each radio head may receive composite signals from multiple controllers that include signal, timing, and/or phase information associated with transmissions over downlinks to multiple mobile units. Each radio head may therefore combine (at 220) portions of the composite signals using the associated timing and/or phase information and then transmit (at 220) the combined signals so that they may be coherently combined (at the mobile unit) with signals transmitted by other radio heads while simultaneously eliminating or minimizing other user interference. In one embodiment, the timing and/or phase information may also be used to transmit (at 220) the combined signals to produce interference nulling/minimization.

Figure 3:
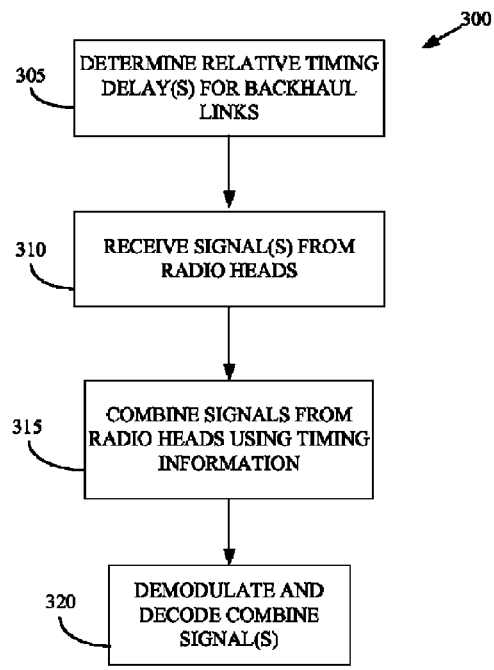
FIG. 3 conceptually illustrates one exemplary embodiment of a method of coherently combining signals received from a plurality of radio heads, in accordance with the present invention.

FIG. 3 conceptually illustrates one exemplary embodiment of a method 300 of coherently combining signals received from a plurality of radio heads. In the illustrated embodiment, the method 300 may be implemented in a controller, such as the controllers 120 depicted in FIG. 1. Each controller is communicatively coupled to one or more radio heads by a corresponding set of backhaul links. Each radio head can receive signals transmitted over the uplink by one or more mobile units. The set of radio heads used to receive signals from each mobile unit may be predetermined or may be selected based upon signal strength measurements and/or quality of signal measurements and/or complex channel gain and phase measurements. The controller determines (at 305) relative time delays for the backhaul links (or legs of the backhaul links) between the controller and each of the associated radio heads. In one embodiment, the relative time delays are determined (at 305) dynamically, e.g., using embodiments of the techniques discussed herein. The controller then receives (at 310) signals from the radio heads over the corresponding backhaul links. In one embodiment, the received signals are analog baseband signals and/or oversampled digital baseband signals that have not been demodulated or decoded by the radio head.

The controller can combine (at 315) signals received from multiple radio heads using timing information associated with the backhaul links to the multiple radio heads. For example, the timing information may be used to determine the relative time delays between two or more of the backhaul links to the radio heads. The relative time delays may then be used to time-align and/or time-shift portions of the received signals so that they are synchronized and may be coherently combined (at 315) or processed with other algorithms such as MMSE, MLD, and/or SIC (Successive Interference Cancellation) or Multi-User Detection (MUD). The controller may then demodulate and/or decode (at 320) the combined signals using conventional techniques. The demodulated and/or decoded signals can then be sent to the network for transmission to its eventual destination.

Embodiments of the techniques described herein may have a number of advantages over conventional techniques in which base stations operate in an uncoordinated fashion so that transmitted and/or received signals cannot be coherently combined. By providing tight synchronization of these signals and high precision of the signal parameters (such as phase and amplitude), embodiments of the techniques described herein may dramatically increase the capacity, coverage, and/or user throughput and performance of wireless communication systems. Coordination of several radio heads and their associated centralized controllers in the manner described herein may also permit the wireless communication system 100 depicted in FIG. 1 to deliver very high downlink data rates to mobile units via coherent combining and interference nulling/minimization at the mobile units. The coordinated operation may also permit the wireless communication system 100 to receive very high data rates at the network via coherent combining and interference nulling/minimization at the network for the uplink. Such schemes yield huge (orders of magnitude) capacity gains. For example, embodiments of the wireless communication system 100 may be able to achieve data transmission rates as high as, or higher than, 1 gigabits per second on the downlink and 100 megabits per second on the uplink.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method performed in a controller, comprising:
   determining, at the controller, at least one relative delay between signals transmitted over a plurality of backhaul links that communicatively couple the controller and a plurality of radio heads;
   transmitting, from the controller to the plurality of radio heads over the plurality of backhaul links, information indicative of a first signal; and
   providing timing information from the controller to the plurality of radio heads over the plurality of backhaul links, the timing information being determined based on said at least one relative delay such that the plurality of radio heads can use the provided timing information to control transmission of the first signal for coherent combination at a receiver.

2. The method of claim 1, wherein determining said at least one relative delay comprises determining at least one of a relative time delay or a relative phase using timing information transmitted over the plurality of backhaul links.

3. The method of claim 1, wherein determining said at least one relative delay comprises:
   providing a plurality of first timing signals over the plurality of backhaul links; and
   determining at least one relative time delay or relative phase based on a plurality of second timing signals received over the plurality of backhaul links in response to the plurality of first timing signals.

4. The method of claim 1, wherein providing the information indicative of the first signal comprises providing at least one of an analog baseband signal and an oversampled digital baseband signal.

5. The method of claim 1, wherein providing the timing information comprises providing information indicative of a global or universal reference time.

6. The method of claim 1, comprising providing gain or phase information associated with the first signal, the gain or phase information indicating relative gains or phases to be used by the plurality of antennas when transmitting the first signals.

7. A method, comprising:
   receiving, at one of a plurality of radio heads over one of a plurality of backhaul links between a controller and the plurality of radio heads, information indicative of a first signal;
   receiving, at said one of the plurality of radio heads over said one of the plurality of backhaul links, timing information determined based on at least one relative delay between signals transmitted over the plurality of backhaul links; and
   transmitting the first signal at a time indicated by the provided timing information so that the first signal coherently combines at a receiver with transmissions of the first signal by at least one other radio head.

8. The method of claim 7, comprising transmitting timing information over at least one of the plurality of backhaul links, the transmitted timing information being used to determine said at least one relative delay, and wherein said at least one relative delay comprises at least one of a relative delay or a relative phase.

9. The method of claim 7, comprising:
   receiving at least one first timing signal over at least one of the plurality of backhaul links; and
   providing at least one second timing signal over said at least one of the plurality of backhaul links in response to receiving said at least one first timing signal.

10. The method of claim 7, wherein receiving the information indicative of the first signal comprises receiving at least one of an analog baseband signal and an oversampled digital baseband signal.

11. The method of claim 7, wherein receiving the timing information comprises receiving information indicative of a global or universal reference time.

12. The method of claim 7, comprising receiving phase information associated with the first signal, and wherein transmitting the first signal comprises transmitting the first signal based on the received phase information.

13. A method, comprising:
receiving, over a plurality of backhaul links between a controller and a plurality of radio heads, information indicative of at least one first signal transmitted by at least one transmitter and received by the plurality of radio heads; and
combining, coherently, said information received over the plurality of backhaul links using at least one relative delay between signals transmitted over the plurality of backhaul links.

14. The method of claim 13, comprising:
receiving timing information from the plurality of radio heads over the plurality of backhaul links; and
combining, coherently, said information using the timing information received from the plurality of radio heads to determine at least one relative time delay or relative phase between signals transmitted over the plurality of backhaul links.

15. The method of claim 13, comprising:
providing a plurality of first timing signals over the plurality of backhaul links; and
combining, coherently, said information based on a plurality of second timing signals received over the plurality of backhaul links in response to the plurality of first timing signals.

16. The method of claim 13, wherein receiving the information indicative of the first signal comprises receiving at least one of an analog baseband signal and an oversampled digital baseband signal.

17. A method, comprising:
transmitting, over a first backhaul link between a first radio head and a controller, information indicative of at least one first signal received from a mobile unit by the first radio head such that said at least one first signal received by the first radio head can be coherently combined with information indicative of said at least one first signal received by at least one other radio head and transmitted over at least one other backhaul link from said at least one other radio head to the controller, said coherent combination being performed by the controller using at least one relative delay between signals transmitted over the first and at least one other backhaul links.

18. The method of claim 17, comprising:
providing timing information such that said at least one first signal received by the first radio head can be coherently combined with said at least one first signal received by said at least one second radio head using the provided timing information to determine at least one relative time delay or relative phase between signals transmitted over the first and at least one second backhaul links.

19. The method of claim 17, comprising:
receiving, from the controller, a first timing signal over the first backhaul link; and
providing, to the controller, a second timing signal over the first backhaul link in response to the first timing signal.

20. The method of claim 17, wherein transmitting the information indicative of the first signal comprises transmitting at least one of an analog baseband signal and an oversampled digital baseband signal.

21. A method, comprising:
coherently combining signals communicated over an air interface between a mobile unit and a plurality of radio heads using at least one relative delay between signals transmitted over a plurality of backhaul links that communicatively couple a controller and the plurality of radio heads.

22. The method of claim 1, wherein said at least one relative delay comprises at least one of a relative time delay or a relative phase.

23. A controller configured to coordinate transmission by a plurality of radio heads by:
determining at least one relative delay between signals transmitted over a plurality of backhaul links that communicatively couple the controller and the plurality of radio heads;
transmitting information indicative of a first signal to the plurality of radio heads over the plurality of backhaul links; and
providing timing information to the plurality of radio heads over the plurality of backhaul links, the timing information being determined based on said at least one relative delay such that the plurality of radio heads can use the provided timing information to control transmission of the first signal for coherent reception at a receiver.

24. The controller set forth in claim 23, wherein determining said at least one relative delay comprises determining at least one of a relative time delay or a relative phase.

25. The controller set forth in claim 23, wherein providing the timing information to the plurality of radio heads comprises providing at least one of a relative time delay or a relative phase.

26. The controller set forth in claim 23, further configured to combine information received by the plurality of radio heads by:
receiving, over the plurality of backhaul links between the controller and the plurality of radio heads, information indicative of at least one first signal transmitted by at least one transmitter and received by the plurality of radio heads; and
combining, coherently, said information received over the plurality of backhaul links using said at least one relative delay between signals transmitted over the plurality of backhaul links.

27. A first radio head configured to operate in coordination with at least one other radio head by:
receiving, at the first radio head over a first backhaul link between a controller and the first radio head, information indicative of a first signal;
receiving, at the first radio head over the backhaul link, timing information determined based on at least one relative delay between signals transmitted over the first backhaul link and signals transmitted over at least one other backhaul link between the controller and said at least one other radio head; and
transmitting the first signal at a time indicated by the provided timing information so that the first signal coherently combines at a receiver with transmission of another version of the first signal by said at least one other radio head.

28. The first radio head set forth in claim 27, being further configured to transmit, over the first backhaul link, information indicative of at least one second signal received from a transmitter by the first radio head such that said at least one second signal received by the first radio head can be coherently combined with other information indicative of said at least one second signal transmitted to the controller.

29. The first radio head set forth in claim 27, wherein said at least one relative delay comprises at least one of a relative time delay or a relative phase.

30. The controller set forth in claim 27, wherein receiving the timing information comprises receiving at least one of a relative time delay or a relative phase.

31. A controller, comprising:
means for determining at least one relative delay between signals transmitted over a plurality of backhaul links that communicatively couple the controller and a plurality of radio heads;
means for transmitting information indicative of a first signal to the plurality of radio heads over the plurality of backhaul links; and
means for providing timing information to the plurality of radio heads over the plurality of backhaul links, the timing information being determined based on said at least one relative delay such that the plurality of radio heads can use the provided timing information to control transmission of the first signal for coherent reception at a receiver.

32. A first radio head, comprising:
means for receiving, over a first backhaul link between a controller and the first radio head, information indicative of a first signal;
means for receiving, over the backhaul link, timing information determined based on at least one relative delay between a signal transmitted over the first backhaul link and at least one signal transmitted over at least one other backhaul link between the controller and at least one other radio head; and
means for transmitting the first signal at a time indicated by the provided timing information so that the first signal coherently combines at a receiver with transmission of another version of the first signal by said at least one other radio head.

33. A transmitter configured to transmit information indicative of a first signal and timing information for the first signal to a plurality of radio heads over a plurality of backhaul links between the transmitter and the radio heads such that each of the plurality of radio heads can control transmission of a version of the first signal for coherent combination at a receiver.

34. The transmitter set forth in claim 33, wherein the timing information for the first signal comprises at least one relative delay between signals transmitted over the plurality of backhaul links.

35. The transmitter set forth in claim 34, wherein said at least one relative delay comprises at least one of a relative time delay or a relative phase between the signals transmitted over the plurality of backhaul links.

36. The transmitter set forth in claim 33, wherein the transmitter is configured to determine said at least one relative delay using timing information transmitted over the plurality of backhaul links.

37. A first radio head configured to receive information indicative of a first signal and timing information for the first signal over a first backhaul link between a controller and the first radio head such that the first radio head can control transmission of a version of the first signal using the timing information for coherent combination at a selected location with at least one other version of the first signal transmitted by at least one other radio head.

38. The receiver set forth in claim 37, wherein the timing information for the first signal comprises at least one relative delay between signals transmitted over the first backhaul link and at least one other backhaul link between the controller and said at least one other radio head.

39. The receiver set forth in claim 38, wherein said at least one relative delay comprises at least one of a relative time delay or a relative phase between the signals transmitted over the first backhaul link and said at least one other backhaul link.

\* \* \* \* \*